US009783252B2

(12) United States Patent
Kim

(10) Patent No.: US 9,783,252 B2
(45) Date of Patent: Oct. 10, 2017

(54) APPARATUS FOR ADJUSTING BICYCLE SADDLE ANGLE IN SEATED POSITION WHILE DRIVING

(71) Applicant: Choon Choo Kim, Seoul (KR)

(72) Inventor: Choon Choo Kim, Seoul (KR)

(73) Assignee: CREVEN CO., LTD, Seoul (KR)

( * ) Notice: Subject to any disclaimer, the term of this patent is extended or adjusted under 35 U.S.C. 154(b) by 58 days.

(21) Appl. No.: 14/778,313

(22) PCT Filed: Nov. 28, 2013

(86) PCT No.: PCT/KR2013/010915
§ 371 (c)(1),
(2) Date: Sep. 18, 2015

(87) PCT Pub. No.: WO2014/148721
PCT Pub. Date: Sep. 25, 2014

(65) Prior Publication Data
US 2016/0059919 A1    Mar. 3, 2016

(30) Foreign Application Priority Data

Mar. 19, 2013  (KR) .......................... 10-2013-0029120
Mar. 19, 2013  (KR) .......................... 10-2013-0029121
Jul. 31, 2013   (KR) .......................... 10-2013-0090931

(51) Int. Cl.
*B62J 1/00* (2006.01)
*B62J 1/08* (2006.01)
(Continued)

(52) U.S. Cl.
CPC ................ *B62J 1/08* (2013.01); *F15B 15/14* (2013.01); *F16H 19/005* (2013.01); *F16H 19/08* (2013.01); *B62J 2001/085* (2013.01)

(58) Field of Classification Search
CPC ........ B62J 1/08; B62J 2001/085; F15B 15/14; F16H 19/005; F16H 19/08
(Continued)

(56) References Cited

U.S. PATENT DOCUMENTS 4,836,604 A * 6/1989 Romano ................... B62J 1/08
                                                        297/203
5,441,327 A * 8/1995 Sanderson ................ B62J 1/08
                                                        297/195.1
(Continued)

FOREIGN PATENT DOCUMENTS

CN      102292257 A    12/2011
DE      19606801 A1    8/1997
(Continued)

OTHER PUBLICATIONS

International Search Report for PCT/KR2013/010915 dated Mar. 26, 2014.

*Primary Examiner* — Gwendolyn Baxter
(74) *Attorney, Agent, or Firm* — STIP Law Group, LLC

(57) ABSTRACT

Disclosed is an apparatus for adjusting a bicycle saddle angle in a seated position while driving, which enables a user on a bicycle saddle mounted on a bicycle to adjust an angle of the bicycle saddle with a simple operation according to a riding and driving state, or the user's needs. The apparatus according to the present invention comprises: a mount (100) of which the lower portion is slidable upward and downward through the upper portion of a saddle frame (10a) and of which the upper portion is in a first fork (110) shape and has a first hinge pin (114) penetrating the centers of the upper end portions thereof; a supporter (116) of which the lower portion is in a second fork (120) shape and has a second hinge pin (122) penetrating the centers of the lower end portions thereof and of which the upper side is connected between the upper end portions of the first fork (110)

(Continued)

shaped portion by the first hinge pin (114); and an actuator (200) fixed with a bracket (210) to be spaced apart from one side of the mount (100) and having an expandably-driven portion connected to the second hinge pin (122) on the corresponding position, wherein a saddle (22) of a bicycle is fixed to the upper end of the supporter (116), and the angle of the saddle (22) is adjusted, about the first hinge pin (114), according to the movement of the supporter (116) resulting from the operation of the actuator (200).

12 Claims, 15 Drawing Sheets

(51) Int. Cl.
  *F15B 15/14* (2006.01)
  *F16H 19/00* (2006.01)
  *F16H 19/08* (2006.01)

(58) Field of Classification Search
  USPC ............... 297/215.13, 215.15; 280/278, 287
  See application file for complete search history.

(56) References Cited

U.S. PATENT DOCUMENTS

| 8,911,012 | B2* | 12/2014 | Choi | B62J 1/04 |
| | | | | 297/215.15 |
| 2011/0254328 | A1* | 10/2011 | Sloan | B62J 1/08 |
| | | | | 297/215.14 |
| 2015/0034779 | A1* | 2/2015 | McAndrews | B62J 1/08 |
| | | | | 248/125.8 |

FOREIGN PATENT DOCUMENTS

| KR | 92-4343 U | 3/1992 |
| KR | 200233268 Y1 | 9/2001 |
| KR | 100954491 B1 | 4/2010 |
| KR | 1020100083023 A | 7/2010 |
| KR | 100981994 B1 | 9/2010 |
| KR | 2020110002522 U | 3/2011 |
| KR | 101027158 B1 | 4/2011 |
| WO | WO2011102562 A1 | 8/2011 |

\* cited by examiner

APPARATUS FOR ADJUSTING BICYCLE SADDLE ANGLE IN SEATED POSITION WHILE DRIVING

CROSS-REFERENCE TO RELATED APPLICATIONS

This application is the U.S. National Phase under 35 U.S.C. §371 of International Application No. PCT/KR2013/010915, filed on Nov. 28, 2013, which in turn claims the benefit of Korean Application No. 10-2013-0029120, filed on Mar. 19, 2015, Korean Application No. 10-2013-0029121, filed on Mar. 19, 2015, and Korean Application No. 10-2013-0090931, filed on Jul. 31, 2013, the disclosures of which are incorporated by reference into the present application.

TECHNICAL FIELD

The present invention relates to an apparatus for adjusting a bicycle saddle angle, and in particular to an apparatus for adjusting a bicycle saddle angle in a seated position while driving which makes it possible to easily adjust a bicycle saddle angle in a state where a rider remains seated on a saddle or while a rider is riding or a rider needs to.

BACKGROUND ART

In general, a bicycle is designed to move forward by driving the wheels with the force from two legs in a state where a rider is seated on a saddle. The pedals are alternately stepped down with two feet with a rider on the saddle holding a handle to rotate the wheels connected through a chain.

The wheels in general are provided in pair. In rare case, there may be only one wheel or three wheels. Such a bicycle has been widely used as one of major transportation means which are driven by manpower. In recent years, the bicycle is being applied for various purposes as a recreation means while providing a health promotion effect as an exercise tool, and needs for the same increases thanks to its environment friendly characteristics.

As illustrated in FIG. 1, the bicycle is configured in such a way that a plurality of frames 10a to 10g are connected in a trust structure. There are provided sprocket wheels 17a and 17b, a chain 19, etc. which are able to transfer a driving force which generates by front and rear wheels 12a and 12b, a handle bar 14, a saddle 22, pedals 18 and an arm 16, to a rear wheel 12b, the operation of which is based on the supporters of the above-mentioned frames 10a to 10g.

At this time, the height of the saddle 22 can be adjusted through a saddle supporter 20 on the top of a saddle frame 10a supported by a main shaft frame 10b and a support frame 10f which are among the plurality of the frames 10a to 10g.

As illustrated in FIG. 2, the height adjustment of the conventional saddle 22 may be obtained by an engaging force of a fixing screw 24 provided at a side portion of the saddle frame 10a in a state where the bottom of the saddle supporter 20 is inserted into the top of the pipe-shaped saddle frame 10a.

In addition, a support 26 is fixed at the top of the saddle supporter 20 by a conventional method, for example, a welding method, etc., and a saddle plate 28 forming a frame of the saddle 22 is installed on the support plate 26.

As seen in the installation structure of the conventional saddle 22, a height adjustment in general is performed based on the engaging force of the fixing screw 24 with respect to the saddle frame 10a. The upward, downward direction angles of the saddle corresponds to a user's body type and a user's posture and habit when riding, and its adjustment is necessary, but there is a hard relationship for the adjustment.

In addition, many persons, for example, a family or colleagues, can use a bicycle together. At this time, a lot of time may be necessary for each person to adjust the angle of the saddle 22 based on his body type, thus causing a lot of problems.

Furthermore, when riding a bicycle, since the angle of the saddle 22 cannot cope with any change in the user's posture when riding on a flat ground and a sloped road, for example, an uphill or a downhill, the user may have many inconveniences.

For example, when the user rides a bicycle on a uphill or a downhill, the user's posture tends to incline in a forward or backward direction of the bicycle. In this case, since the angle of the saddle 22 is fixed, the user may feel any inconvenience in his posture, thus causing a high risk to accident.

PRIOR ART TECHNICAL DOCUMENT

Patent Document

Korean Patent Publication No. 2009-0085900 (Aug. 10, 2009)
Korean Patent Publication No. 0981994 (Sep. 7, 2010)

DISCLOSURE OF INVENTION

Technical of Invention

Accordingly, the present invention is made to improve or resolve the above-mentioned problems. It is an object of the present invention to provide an apparatus for adjusting a bicycle saddle angle in a seated position while driving wherein the angle of a saddle can be easily adjusted based on a user's body type in a state where a user is riding a bicycle, and the apparatus can be compatible with a conventional bicycle structure, and while driving a bicycle on an inclined road, it is possible for a user to adjust in person the angle of a saddle based on any change in a user's posture due to the inclined road.

Solution to Problem

To achieve the above objects, there is provided an apparatus for adjusting a bicycle saddle angle in a seated position while driving, which may include, but is not limited to, a mount 100 which includes a first hinge pin the bottom of which is slidable upward and downward through the upper portion of a saddle frame 10a, and the top of which connects a portion between them to the center of the top in a shape of a first fork 110; a supporter 116 which includes a second hinge pin 122 the bottom of which connects a portion between them to the center of the bottom in a shape of a second fork 120, and the top of which is connected with the first hinge pin 114 and between the portions shaped like the first fork 100; and an actuator which is fixed with a bracket 210 to be spaced apart from one side of the mount 100, wherein an extendable driving portion is connected to the second hinge pin 122 at a corresponding position, wherein a saddle 22 of the bicycle is fixed at the top of the supporter 116, so the angle of the saddle 22 can be adjusted based on the rotation of the supporter 116 with the aid of a driving of the actuator 200 about the first hinge pin 114.

At this time, the actuator 200 may include, but is not limited to, a hydraulic cylinder 220 which drives contractively the cylinder rod 222 hinged with the second hinge pin 122; a hydraulic circuit 250 which is connected communicating with the hydraulic cylinder 220 so as to change fluid; a motor 260 which is connected to the hydraulic circuit 250 and is configured to provide a pumping driving force with respect to the flow of fluid of the hydraulic cylinder 220 and the hydraulic circuit 250 based on a normal and reverse direction rotation as electric power is supplied; and a switch 270 which is configured to control of the supply of electric power with respect to a normal or reverse direction rotation and stop of the motor 260.

In addition, a front end portion of the cylinder rod 222 further includes a connection member 240 hinged with the second hinge pin 122 to a longitudinal hole 230 having a predetermined length in upward and downward directions.

Also, the first hinge pin 114 and the second hinge pin 122 are disposed parallel with each other, and the bottom of the supporter 116 including the second hinge pin 122 is arranged rotatable about the first hinge pin 114.

To achieve the above objects, there is provided an apparatus for adjusting a bicycle saddle angle in a seated position while driving, which may include, but is not limited to, a saddle supporter 116' for supporting a saddle 22; a worm wheel 320 which is fixed at the bottom of a saddle supporter 116'; a worm shaft 330 which allows to rotate a worm wheel 320; a driving motor 340 which is configured to rotate in a normal and reverse rotation direction the worm shaft 330; and a housing 310 which is configured to accommodate the worm wheel 320 and the worm shaft 330 and is fixed at a mount 100 which is slidable upward and downward through the upper portion of a saddle frame 10a.

In this case, the housing 310 is configured to accommodate the driving motor 340.

In addition, the driving motor 340 is controlled to rotate in a normal or reverse rotation direction based on the operation of an operation switch "SW" installed at a handle bar 14.

To achieve the above objects, there is provided an apparatus for adjusting a bicycle saddle angle in a seated position while driving, which may include, but is not limited to, a saddle supporter 116' for supporting a saddle; a bracket 410 to which the saddle supporter 116' is engaged rotatable, wherein the bracket 410 is supported by the mount 100 which is slidable upward and downward over the top of the saddle frame 10a; a wire 420 both ends of which are supported by the bracket 410, the wire 420 being configured to connect the bracket 410 and the saddle supporter 116' in order for the saddle supporter 116' to be rotatable with respect to the bracket 410; and an operation switch "SW" to which the wire 420 is connected, thus pulling the wire 420 or removing the pulling of the wire 420, thus allowing to adjust the angle of the saddle 22 in such a way to rotate the saddle supporter 116' with respect to the bracket 410.

At this time, both ends of the wire 420 are supported spaced apart from the bracket 410 with the saddle supporter 116' being disposed between them, and the wire 420 forms a closed loop.

In addition, there may be further provided at least one guide roller 440a, 440b which is disposed at both sides of the bracket 410 with the saddle supporter 116' being disposed between them, thus guiding the movement of the wire 420; and at least on direction changing roller 450a, 450b which is disposed at both sides of the wire 420 while corresponding to the guide rollers 440a, 440b, thus changing the moving direction of the wire 420.

In addition, one end of the wire 420 is wound around the guide roller 440a of one side and the direction changing roller 450a of one side in a zigzag shape, and the other end of the wire 420 is wound around the guide roller 440b of the other side and the direction changing roller 450b of the other side in a zigzag shape.

In addition, the guide rollers 440a, 440b and the direction changing rollers 450a, 450b are provided multiple in number, and the guide rollers 440a, 440b and the direction changing rollers 450a, 450b are arranged in the longitudinal direction of the saddle supporter 116'.

Advantageous Effects

In the apparatus for adjusting a bicycle saddle angle in a seated position while driving according to the present invention, a mount is installed at a saddle frame to adjust the height of a saddle like a conventional general type saddle supporter, and an actuator is installed on the mount, wherein the actuator is configured to adjust the angle of a saddle including a saddle and a support, whereupon the apparatus of the present invention can be used compatible with a conventional bicycle, and the angle of the saddle can be adjusted while driving based on a user's intention in such a way to perform a simple switch operation of the actuator, thus increasing a use convenience.

Since the angle of a saddle can be adjusted based on user's various body types, a user can ride a bicycle in a stable posture, and it is possible to have an effect on easily and freely adjusting the angle of a saddle based on a riding condition of a bicycle with smaller force in a seated position on the saddle.

DETAILED DESCRIPTION

Figure 1:
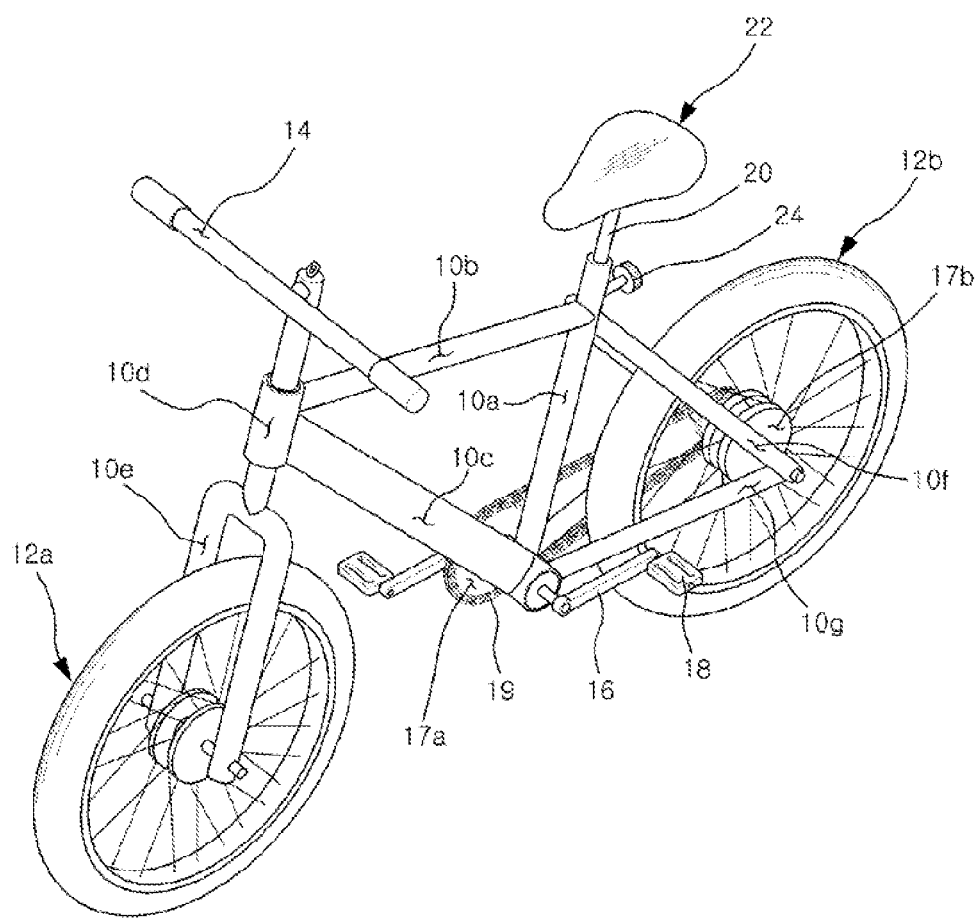
FIG. 1 is an exemplary perspective view illustrating a conventional bicycle.
Figure 2:
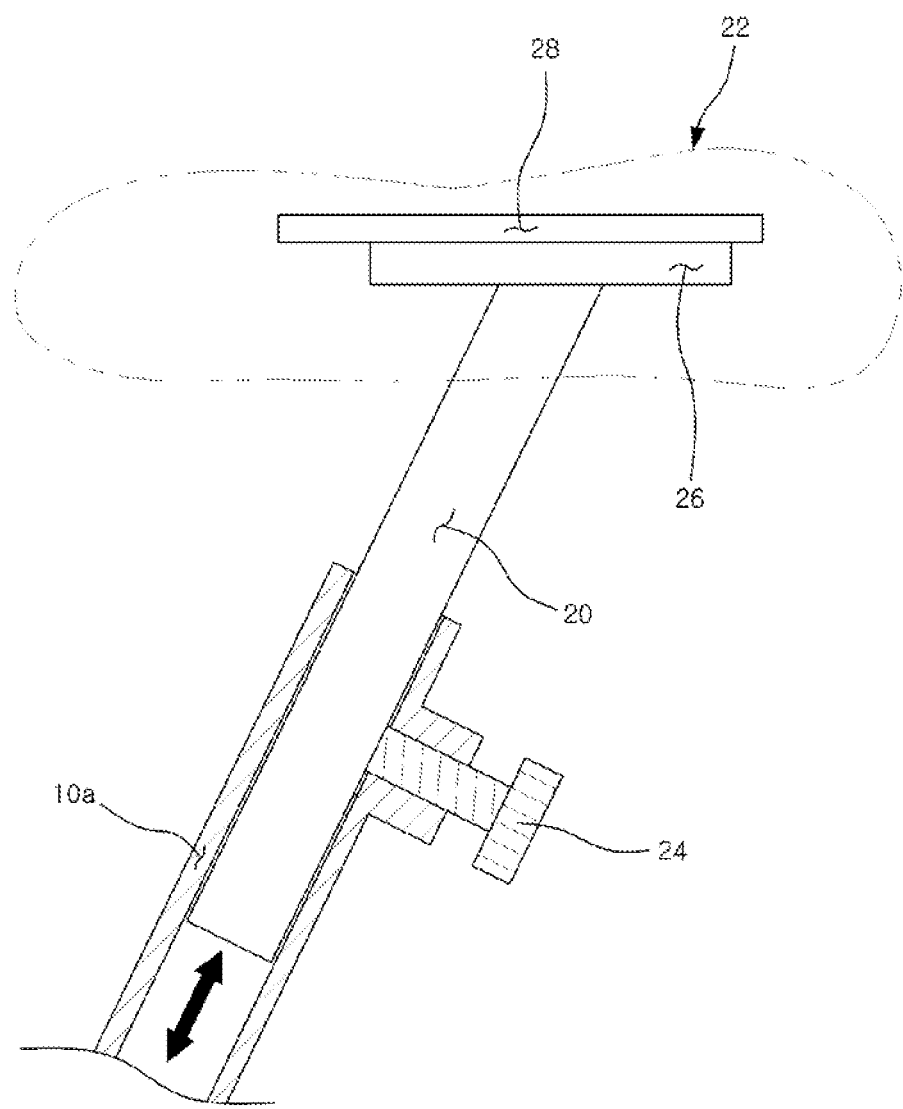
FIG. 2 is an exemplary partial cross sectional view illustrating a saddle structure in FIG. 1.

The terms or words used in the present specification and claims should be interpreted as a meaning and concept corresponding to the technical concepts of the present invention based on the principle wherein the inventor can appropriately define the concept of the term so as to describe in the best way his invention, not being interpreted as limiting to conventional or dictionary meaning.

It should be understood that the configurations illustrated in the embodiment and drawing in the present specification is provided as an exemplary embodiment, not representing all the technical concepts of the present invention, so there may be various equivalents and modification which could be substituted at the time the present application is filed.

Exemplary embodiments of the present invention will be described below with reference to the accompanying drawings.

[First Exemplary Embodiment]

The apparatus for adjusting a bicycle saddle angle according to an exemplary embodiment of the present invention, as illustrated in FIGS. 3 to 6, may include, but is not limited to, a mount 100 and an actuator 200.

At this time, the mount 100 may include, but is not limited to, a first fork 110 having a first open part 112 (refer to FIG. 6) the top of which is open in a U-shape, and a first hinge pin 114 which is inserted traversing the first open part 112 at the top of the first fork 110.

In addition, the bottom of the first fork 110 is inserted slidable into the top of an saddle frame 10a, so it can slide upward and downward and is fixed with a fixing screw 24, whereupon the height thereof can be adjusted.

The bottom of the supporter 116 is inserted into the first open part 112, and a part of the supporter 116 is fixedly hinged in place rotatable in the inside of the first open part 112 with the aid of the first hinge pin 114.

At the bottom of the supporter 116, there is formed a second fork 120 having a second open part 118 (refer to FIG. 6) which is open in a ∩-shape, and the second fork 120 may include a second hinge pin 122 which is inserted traversing the second open part 118.

It is obvious that the bottom of the mount 100 is installed corresponding to the saddle frame 10a and may change in shape based on the saddle frame 10a, whereupon it is possible to estimate that the thicknesses of the top and bottom of the mount 100 may be formed different from each other, not limiting to the configuration in the drawings.

In addition, the first fork 110 and the second fork 120 are formed opposite in directions and same in shapes and include a first hinge pin 112 and a second hinge pin 122, respectively.

In addition, the supporter 116 is basically disposed in parallel with the first fork 112 and between them, and a part of the length of the supporter 116 is hinged to the first hinge pin 112, whereupon the bottom and top of the supporter 116 can rotate about the first hinge pin 112.

Furthermore, the support plate 26 is fixed at a predetermined angle at the top of the supporter 116 so as to install the saddle 22, and the saddle 22 including a saddle plate 28 is installed on the support plate 26 in a known way.

Meanwhile, the actuator 200 is fixed with a bracket 210 while being spaced apart from one side of the mount 100 wherein an extending and driving portion is connected to the second hinge pin 122 at a corresponding position, and the actuator 200 may include a hydraulic cylinder 220 which is installed to correspond to the direction where the bottom of the supporter 116 rotates, with the aid of the bracket 210 fixedly provided at the mount 100 within a range where it does not interfere with the rotation of the bottom of the supporter 116 with respect to an outer wall of each of both sides of the mount 100 or the first port.

At this time, the cylinder rod 222 is connected to the hydraulic cylinder 220, and an end portion of the cylinder rod 222 is hinged at the second hinge pin 122 provided below the supporter 116 and can extend and operate in the direction where the second hinge pin 122 rotates.

Here, the configuration wherein the cylinder rod 222 is hinge-connected with respect to the second hinge pin 122 may be obtained in such a way that an end portion of the cylinder rod 222 is formed flat to be inserted between the second forks 120, and a hinge connection with respect to the second hinge pin 122 may be obtained by forming and correspondingly connecting, to a flat portion of the cylinder rod 222, a longitudinal hole 230 having a predetermined length in upward and downward directions so as to correspond to any displacement occurring due to the rotation of the second hinge pin 122.

As illustrated in FIGS. 3 to 6, the connection member 240 which separately forms the longitudinal hole 230 in a flat shape to be inserted between the second forks 120 may be installed at an end portion of the cylinder rod 222.

At the top or lateral side of the hydraulic cylinder 220, a hydraulic circuit 250 which allows to exchange fluid with the hydraulic cylinder based on the flow of fluid is installed. At the hydraulic circuit 250, a motor 260 is installed, which allows to provide a pumping driving force with respect to the fluid flow of the hydraulic cylinder 220 and the hydraulic circuit 250 based on normal and reverse direction rotations based on electric power.

At the motor 260, as stated above, there may be provided a switch 270 in order for a user to control the supply of electric power with respect to the normal and reverse direction rotations and stop for a pumping driving force for the flow of fluid.

In addition to the above configuration, a battery (not illustrated), etc. may be further provided at the actuator so as to supply electric power to the motor 260 through the switch 270.

According to the thusly constituted apparatus for adjusting a bicycle saddle angle in a seated position while driving, the first hinge pin 114 and the second hinge pin 122 are arranged in parallel to each other, and the bottom of the supporter 116 including the second hinge pin 122 is rotatable about the first hinge pin 114, and the rotational angle of the saddle 22 fixed on the top of the supporter 116 may be relationally determined based on the extensional driving and its level of the cylinder rod 222 of the corresponding actuator 200, and such a driving may be relationally determined by the operation of the switch 270 of the user.

Figure 3:
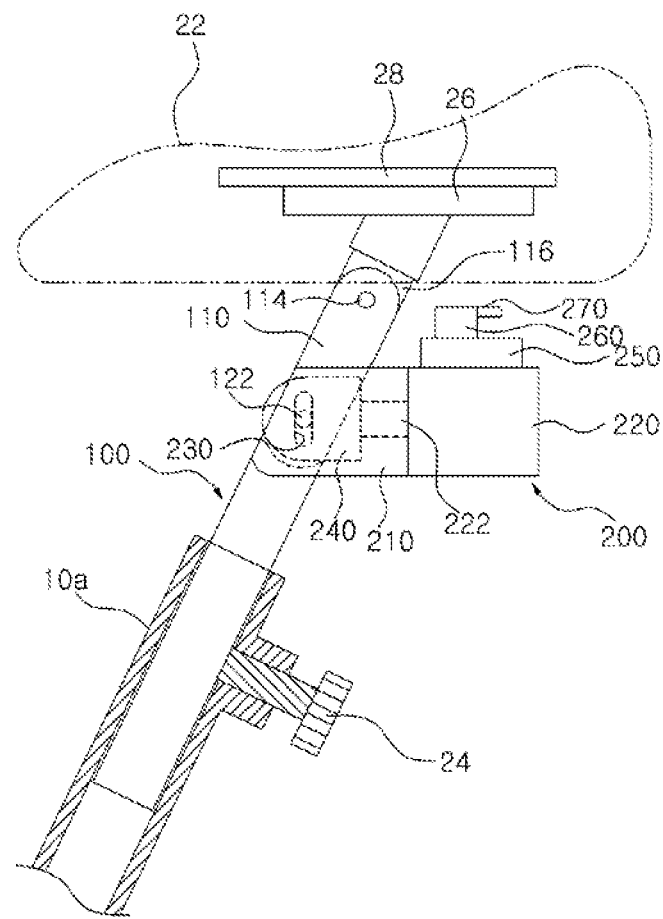
FIGS. 3 to 5 are exemplary partial cross sectional views illustrating an apparatus for adjusting a bicycle saddle angle in a seated position while driving according to a first exemplary embodiment of the present invention.
Figure 4:
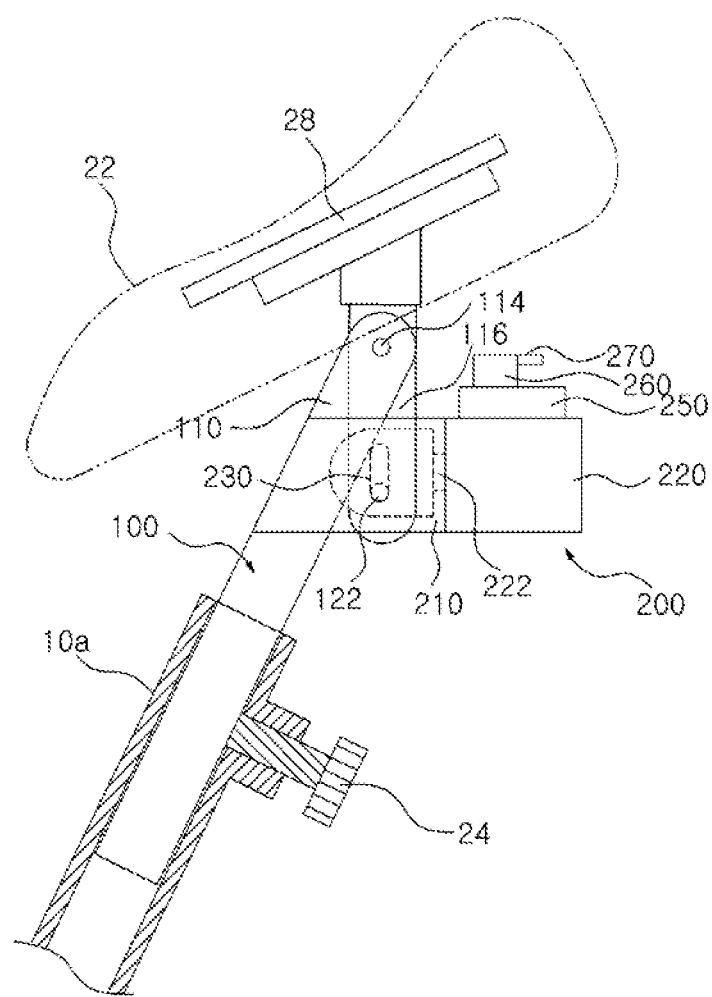
Figure 5:
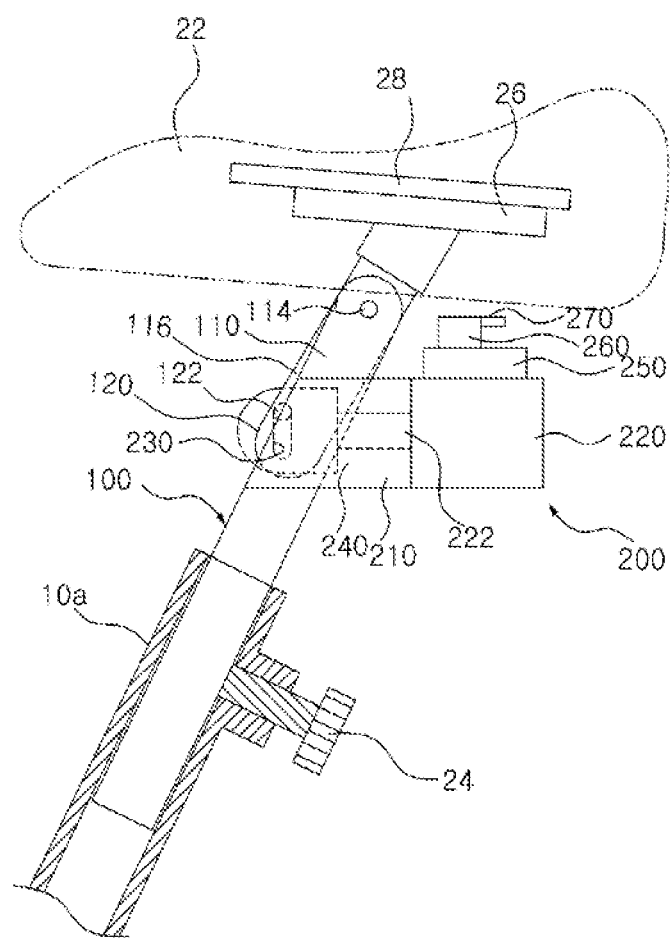
Figure 6:
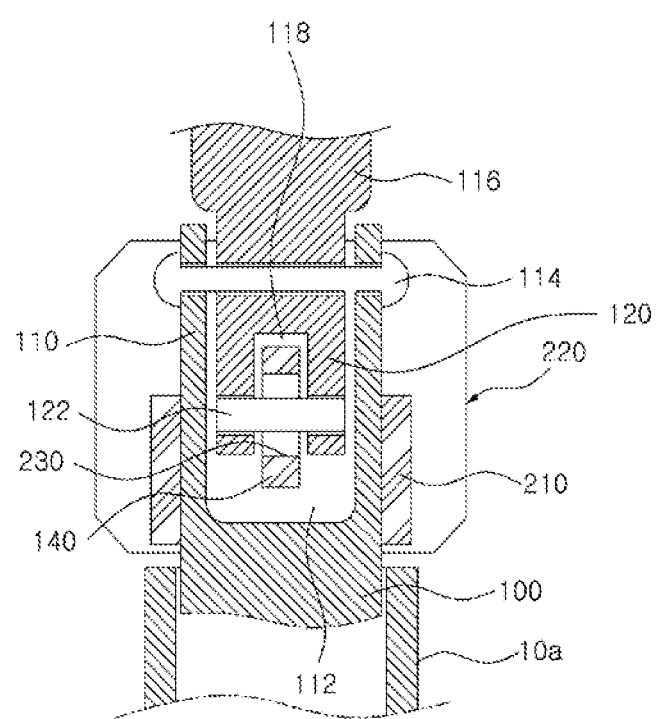
FIG. 6 is an exemplary front cross sectional view illustrating a connection relationship between a mount, a support and a cylinder rod so as to adjust a bicycle saddle angle according to a first exemplary embodiment of the present invention.
Figure 7:
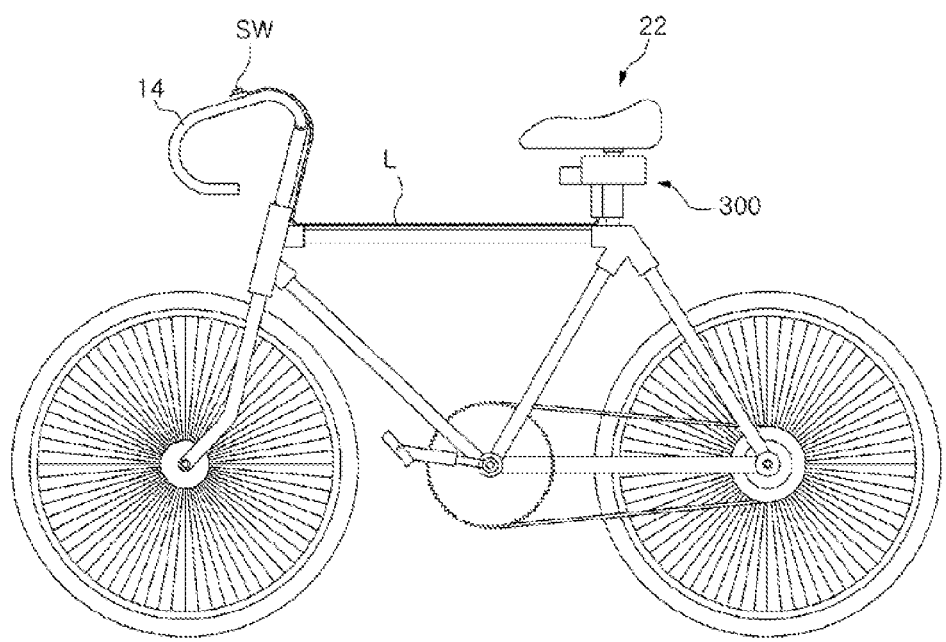
FIG. 7 is an exemplary side view illustrating an installation example of an apparatus for adjusting a bicycle saddle angle in a seated position while driving according to a second exemplary embodiment of the present invention.
Figure 8:
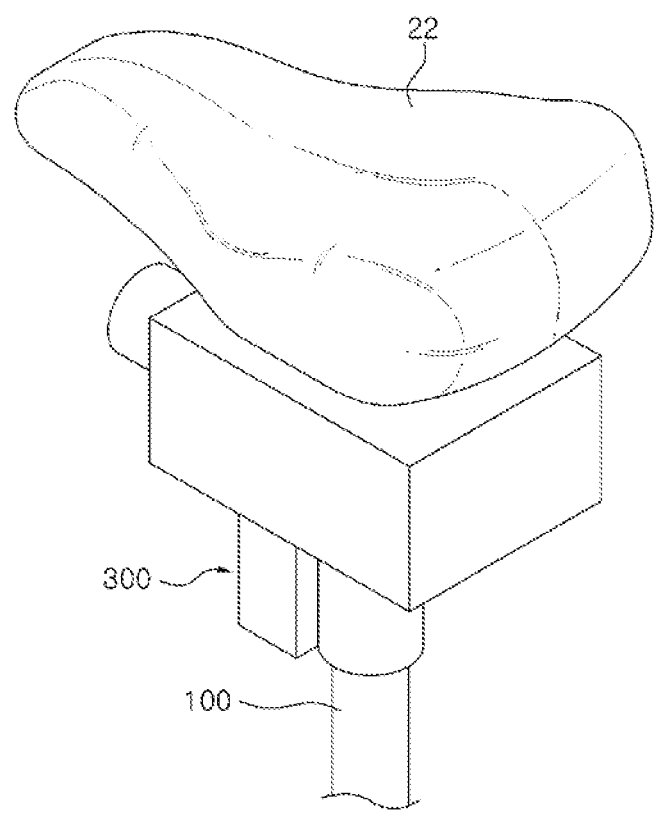
FIG. 8 is a partially enlarged perspective view illustrating a saddle angle adjusting unit in FIG. 7.

In a state where the saddle 22 remains parallel as illustrated in FIG. 3, when the cylinder rod 222 moves backward, the supporter 116 rotates in a counterclockwise direction about the first hinge pin 114 operating as a rotation axis as illustrated in FIG. 4, whereupon the saddle 22, as illustrated in FIG. 4, operates inclined forward as illustrated in FIG. 4, and on the contrary, when the cylinder rod 222 moves forward, the supporter 116 rotates in a clockwise direction about the first hinge pin 114 operating as a rotation axis as illustrated in FIG. 5, whereupon the saddle 22 operates to be upright toward the initial position.

In the above way, the apparatus for adjusting angle according to a first exemplary embodiment of the present invention has an advantage easily, conveniently and freely adjusting the rotation angle of the saddle 22 based on the operation of the hydraulic cylinder 220.

[Second Exemplary Embodiment]

The second exemplary embodiment of the apparatus for adjusting a bicycle saddle angle according to the present invention which is different from the above-described first exemplary embodiment may be modified in such a way that the angle of the saddle 22 can be adjusted using the saddle angle adjusting nit 300 as illustrated in FIGS. 7 to 11.

In this case, it does not need to install the first fork 110 (refer to FIG. 3) on the top of the mount 100, and it is preferably formed in a cylindrical shape. The housing 310 may be fixed in a type where the insertion part 312 is inserted into the top of the mount 100.

Figure 9:
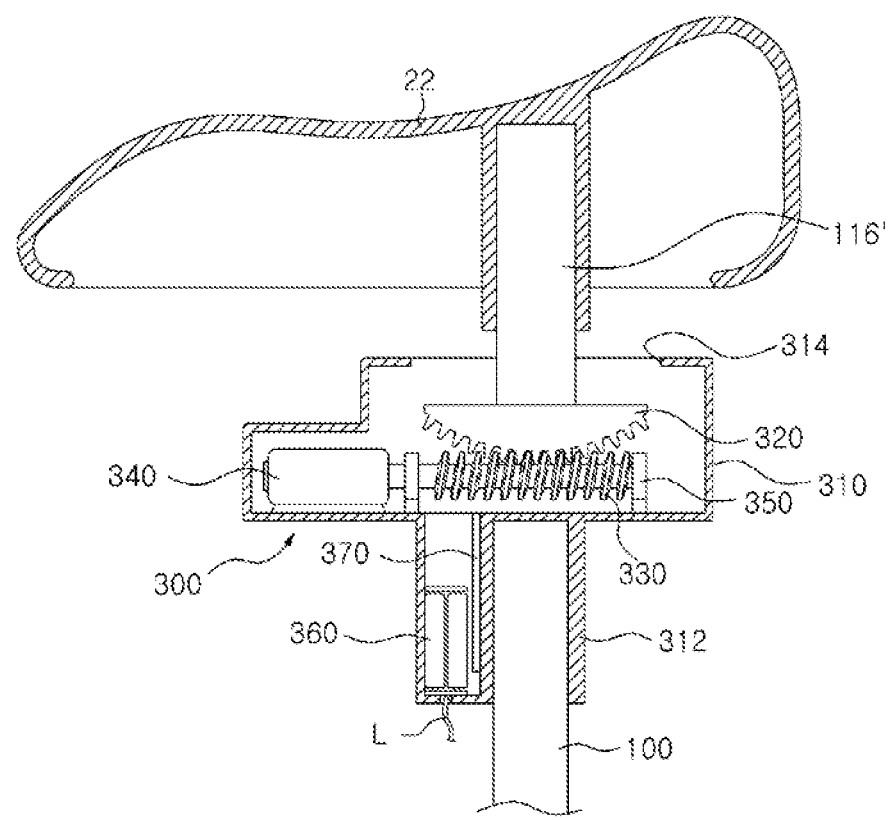
FIG. 9 is a cross sectional view illustrating a major component in FIG. 8.
Figure 10:
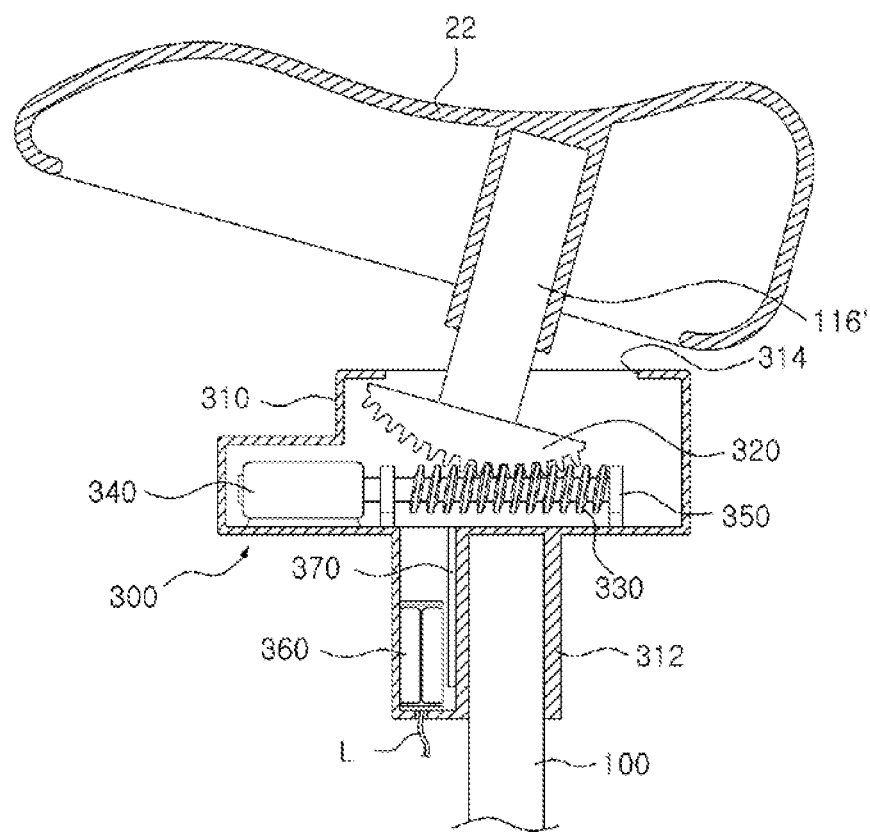
FIGS. 10 and 11 are exemplary use state cross sectional views illustrating an apparatus for adjusting a bicycle saddle angle according to a second exemplary embodiment of the present invention.
Figure 11:
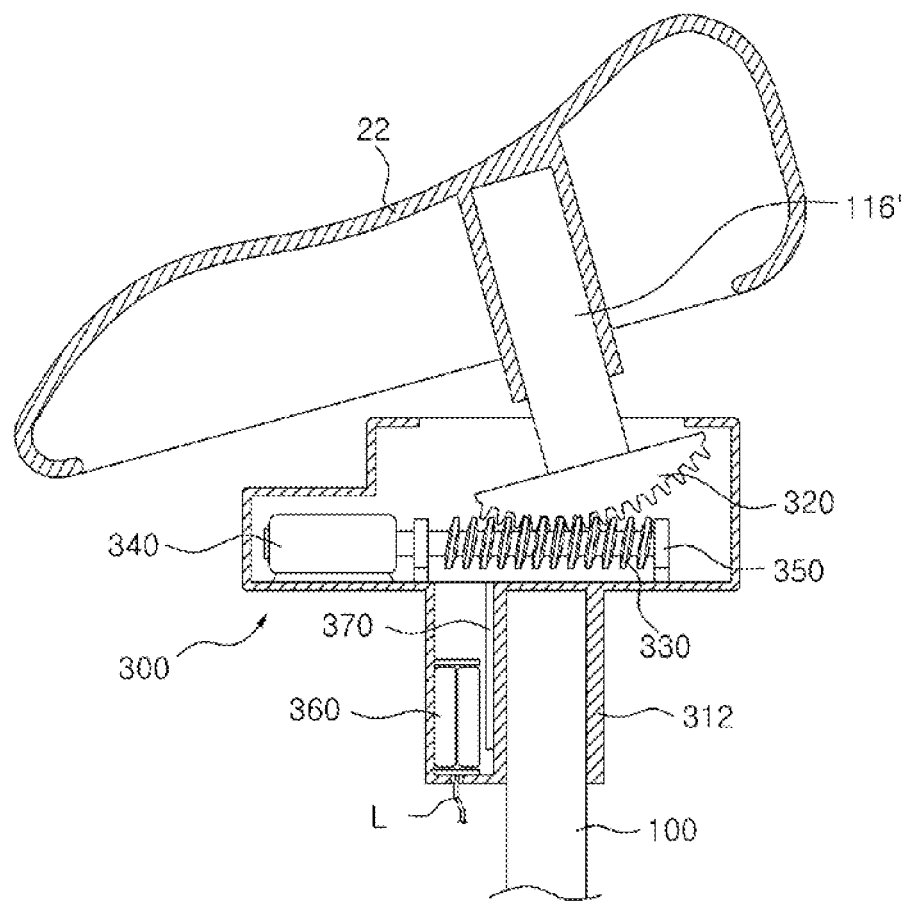
Figure 12:
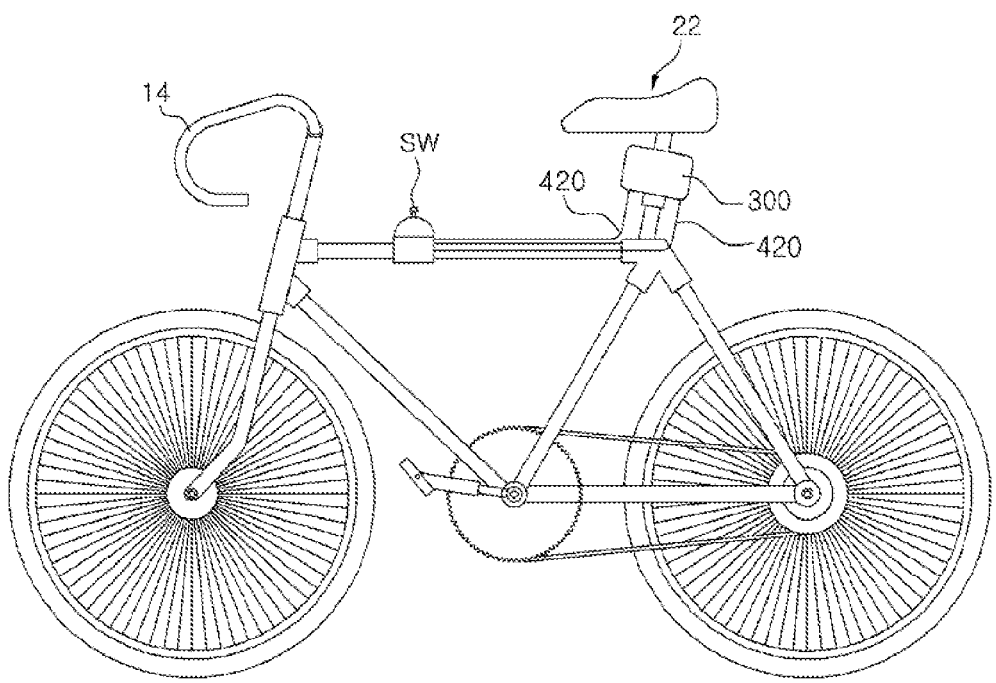
FIG. 12 is an exemplary side view illustrating an embodiment example of an apparatus for adjusting a bicycle saddle angle in a seated posture while driving according to a third exemplary embodiment of the present invention.

In this case, as illustrated in FIG. 9, the insertion part 312 is a structure which extends downward from the lower surface of the housing 310. The housing 310 is a formed in a box shape which defines an exterior of the saddle angle adjusting unit 300.

In addition, according to the second exemplary embodiment of the present invention, the saddle 22 is supported by the saddle supporter 116', and a worm wheel 320 is integrally fixed at the bottom of the saddle supporter 116', and the worm wheel 320 is engaged in the inside of the housing 310 to the a worm shaft 330 and a gear.

At this time, the worm shaft 330 is assembled rotatable in the normal and reverse directions by the driving motor 340 disposed inside the housing 310.

In addition, the worm wheel 320 is formed in a partially circular shape and includes teeth along its circumference to rotate engaged with the worm shaft 330.

The saddle supporter 116' is fixed integral with the top in the center of the worm wheel 320.

In addition, the worm shaft 330 has a rod shape having a predetermined length, and teeth are formed on an outer circumference of the worm shaft 330 and rotate engaged with the worm wheel 320 along a longitudinal direction of the worm shaft 330. Both ends of the worm shaft 330 are supported rotatable by a bearing 350.

In addition, as described above, the driving motor 340 is directly connected to the worm shaft 330 and allows to rotate the worm shaft 330 in a normal or reverse direction.

In addition, the housing 310 has a hollow cylindrical shape at its one side wherein an opening 314 is formed and is supported by the mount 100. The saddle supporter 116' passes through the opening 314. An insertion part 312 into which the mount 100 is inserted and engaged is formed at a lower side of the housing 310. It is preferred that the insertion part 312 is arranged coaxial with the saddle supporter 116' when the saddle 22 remains horizontal.

Here, the housing 310 may be formed in an integrated form or may be formed in a structure which can separate into upper and lower parts or into left and right parts.

In addition, the battery 360 is accommodated as an electric power supply part in the inside of a lower portion of the housing 310 so as to supply electric power to the driving motor 340, and a control board 370 is accommodated as a control part in an inside of the lower portion thereof so as to control the driving of the driving motor 340.

In this case, the driving motor 340, the battery 360, the control board 370, etc. may be arranged at an outer side of the housing 310, not being accommodated in the housing 310.

Meanwhile, the battery 360 is connected via an electric wire "L" to the operation switch "SW" disposed at the handle bar 14. Electric power can be supplied to the driving motor 340 from the battery 360 based on the operation of the operation switch "SW", thus operating the driving motor 340.

Here, the operation switch "SW" may be disposed at an outer side of the housing 310, not being disposed at the handle bar 14, which is not illustrated in the drawing.

With the above configuration, the apparatus for adjusting a bicycle saddle angle in a seated position while driving according to the second exemplary embodiment of the present invention operates as follows.

For example, in a state where the saddle 22 remains horizontal as illustrated in FIG. 9, in order to drive the driving motor 340, the user may control the operation switch "SW" for the driving motor 340 to rotate in a reverse direction (counterclockwise direction).

In this way, the worm shaft 330 rotates in a reverse direction, and the work wheel 320 engaged thereto rotates in a clockwise direction.

Since the worm wheel 320 rotates in a clockwise direction, the saddle supporter 116' rotates in a clockwise direction. The angle can be adjusted in such a way that the front of the saddle 22 is lifted up since the saddle 22 rotates in a clockwise direction.

Meanwhile, as illustrated in FIG. 9, in a state where the saddle 22 remains horizontal, the user operates the operation switch "SW" in order for the driving motor 340 to rotate in a normal direction (clockwise direction), thus driving the driving motor 340.

Therefore, the worm shaft 330 rotates in a normal direction, and the worm wheel 320 tooth-engaged thereto rotates in a counterclockwise direction.

Since the worm wheel 320 rotates in a counterclockwise direction, the saddle supporter 116' rotates in a counterclockwise direction. The angle can be adjusted in such a way that the front end of the saddle 22 descends and tilts downward.

Thus, the saddle angle adjusting function according to a second exemplary embodiment of the present invention allows to enable a user to ride a bicycle in the most comfortable posture based on the user's body type. When the bicycle runs up or down the inclined way, the user can easily adjust the angle of the saddle in response to such a situation, whereupon the user's body does not lean toward one direction, thus preventing any accident. In particular, it is possible to easily and freely adjust the angle of the saddle in such a way to drive the driving motor while riding the bicycle.

[Third Exemplary Embodiment]

The apparatus for adjusting a bicycle saddle angle according to a third exemplary embodiment of the present invention is obtained by modifying the structure of the second exemplary embodiment into another type as illustrated in FIGS. 12 to 15.

Figure 13:
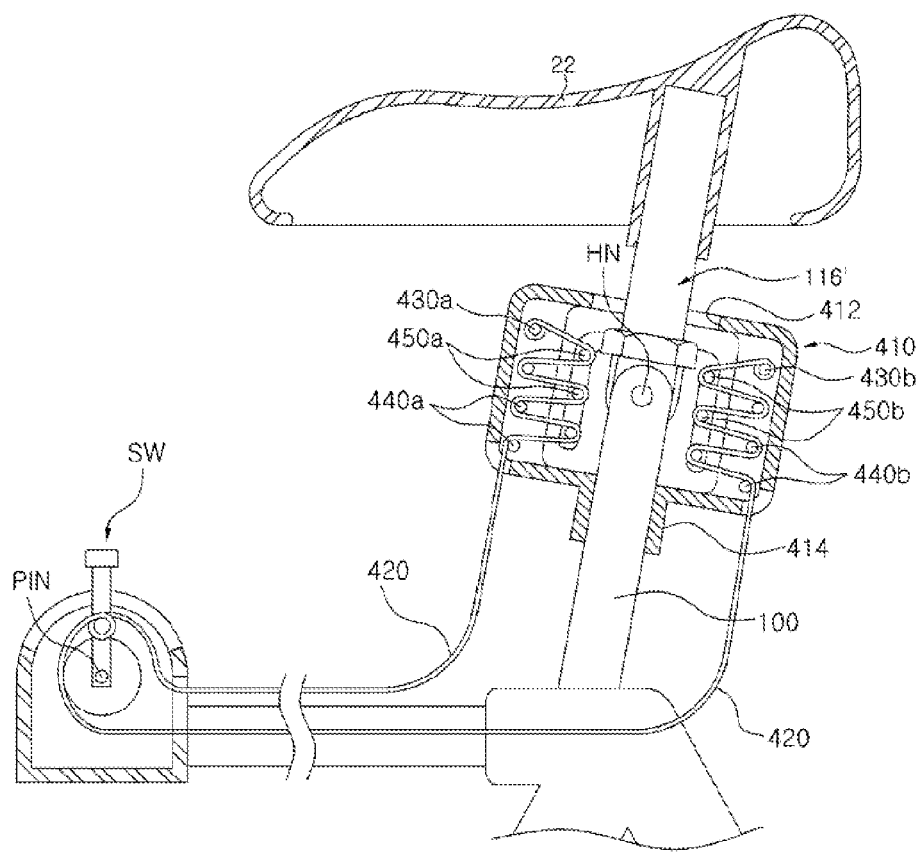
FIG. 13 is a cross sectional view illustrating a major component in FIG. 12.

As illustrated in FIG. 13, the saddle angle adjusting unit 300 according to a third exemplary embodiment of the present invention may include, but is not limited thereto, a bracket 410.

Here, the bracket 410 has at its one side a hollow container shape having an opening 412 and is supported by the mount 100.

In addition, the saddle supporter 116' passes through the opening 412 formed on the top of the bracket 410, and at the bottom of the bracket 410, an insertion part 414 into which the mount 100 is inserted is formed.

In this case, it is preferred that the insertion part 414 is arranged coaxial with the saddle supporter 116' when the saddle 22 remains horizontal.

In addition, a first wire support 430a and a second wire supporter 430b configured to support both ends of the wire 420 are provided at both sides of the top of the inside of the bracket 410 with the saddle supporter 116' being disposed between the first wire support 430a and the second wire supporter 430b.

Here, the bracket 410 may be integrally formed or may have a structure wherein the bracket 410 separates into upper and lower parts or left and right parts.

In addition, the wire 420 may include a predetermined length, and both ends of the wire 420 are supported by the first wire support 430a and the second wire supporter 430b of the bracket 410.

In addition, the wire 420 is supported spaced apart from the bracket 410 with the saddle supporter 116' being disposed between the wires 420, and the wire 420 forms a closed loop.

In addition, the wire 420 interconnects the bracket 410 and the saddle supporter 116' in order for the saddle supporter 116' to be rotatable with respect to the bracket 410.

In particular, the saddle supporter 116' and the top of the mount 100 are hinged (HN) and are configured foldable.

The operation switch "SW" is connected to a pathway of the wire 420, thus pulling the wire 420 or removing the pulling thereof.

The operation switch "SW" is installed rotatable with respect to the mount 100 by means of a pin "PIN" for the sake of a rotation by a predetermined angle.

Therefore, it is possible to adjust the angle of the saddle 22 by rotating the saddle supporter 116' with respect to the bracket 410 in such a way to pull the wire 420 or remove the pulling of the wire 420.

In the third exemplary embodiment of the present invention, it shows that the operation switch "SW" is provided on the mount 100. It is obvious that the operation switch "SW" may be provided on the handle bar 14.

Meanwhile, the bicycle according to a third exemplary embodiment of the present invention may further include, but is not limited to, a plurality of first and second guide rollers 440a and 440b configured to guide the movements of the wire 420, and a plurality of first and second direction change rollers 450a and 450b configured to change the moving direction of the wire 420.

The plurality of the guide rollers 440a and 440b are provided in the longitudinal direction of the saddle supporter 116' and at both sides of the bracket with the saddle supporter 116' being disposed between them.

Here, six guide rollers 440a and 440b are disposed at both sides of the bracket 410 in the third exemplary embodiment of the present invention, but the number of such guide rollers is not limited. At least one guide roller may be provided.

Hereinafter, the guide roller positioned at the left side in FIG. 13 is called a first guide roller 440a, and the guide roller positioned at the right side is called a second guide roller 440b.

Corresponding to the first and second guide rollers 440a and 440b, pluralities of first and second direction changing rollers 450a and 450b are disposed at both sides of the saddle supporter 116'. In the illustrated drawings, corresponding to the number of the first and second guide rollers 440a and 440b, six first and second direction changing rollers 450a and 450b are disposed at both sides of the saddle supporter 116', respectively. Here, the number of such direction changing rollers is not limited. At least one direction changing roller may be provided.

In addition, in the first and second direction changing rollers 450a and 450b, the direction changing roller positioned at the left side is called a first direction changing roller 450a, and the direction changing roller positioned at the right side is called a second direction changing roller 450b.

Therefore, one end of the wire 420 is wound around the first guide roller 440a and the first direction changing roller 450a in a zigzag shape, and the other end of the wire 420 is wound around the second guide roller 440b and the second direction switching roller 450b in a zigzag shape.

According to the above described configuration, as illustrated in FIG. 13, when the operation switch "SW" rotates at a predetermined angle toward the backside of the bicycle with the saddle 22 being horizontal, a tensional force occurs at the wire 420 which is the second wire supporter 430b and the second guide roller 440b and the second direction changing roller 450b were located.

Figure 14:
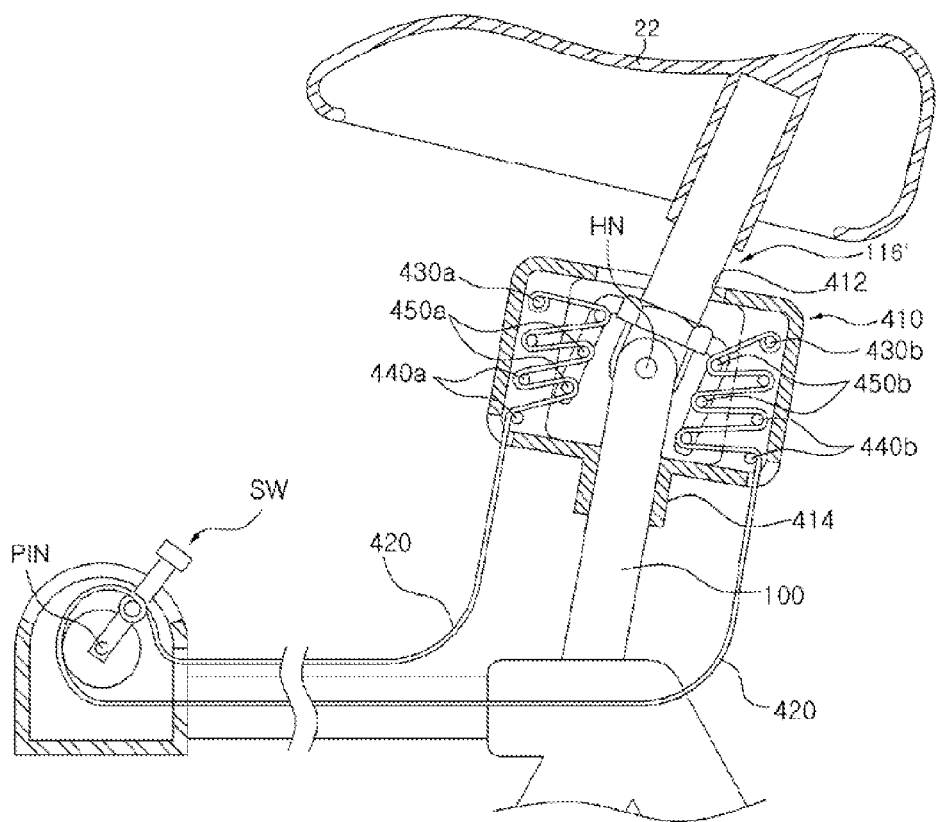
FIGS. 14 and 15 are exemplary use state cross sectional views illustrating an apparatus for adjusting a bicycle saddle angle according to a third exemplary embodiment of the present invention.

As illustrated in FIG. 14, the saddle supporter 116' rotates in a clockwise direction. Since the saddle supporter 116' rotates in a clockwise direction, it is possible to adjust the angle in such a way that the saddle 22 rotate in a clockwise direction, and the front end of the saddle 22 is lifted upward.

Figure 15:
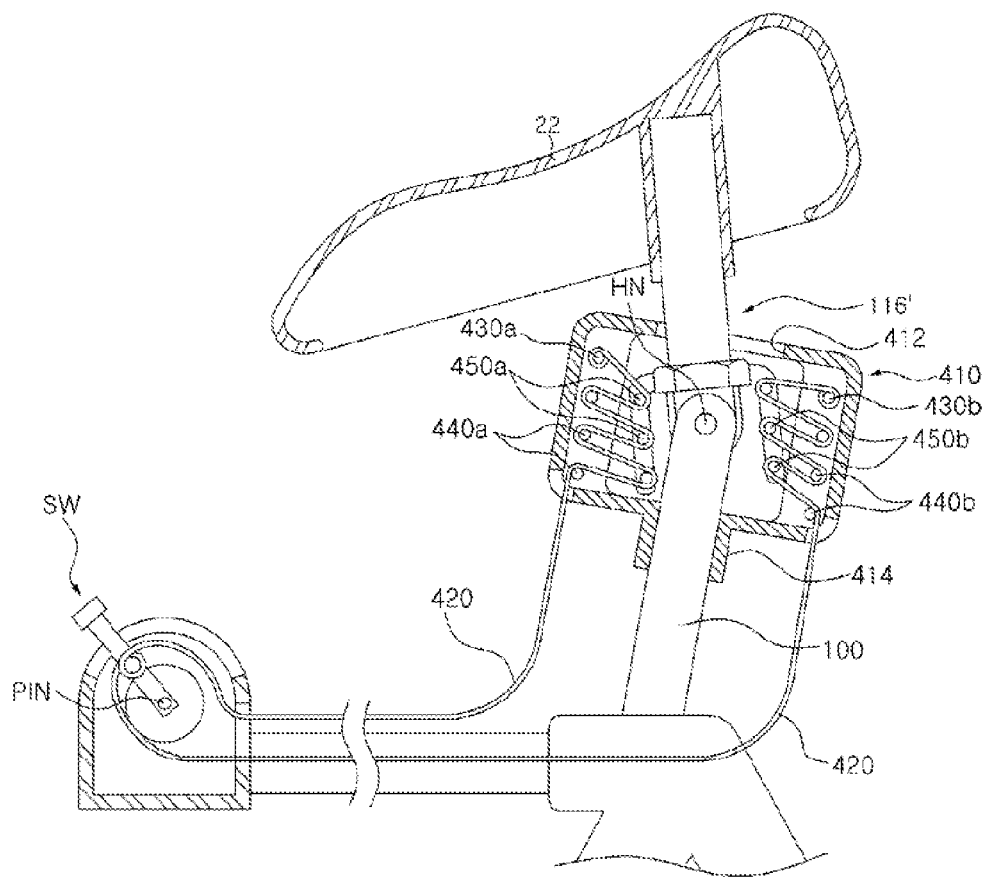

Meanwhile, as illustrated in FIG. 15, with the saddle 22 being horizontal, when the operation switch "SW" rotates at a predetermined angle toward the front side of the bicycle, a tensional force occurs at the wire 420 which is the first wire support 430a and the first guide roller 440a and the first direction changing roller 450a were located.

As illustrated in FIG. 14, the saddle supporter 116' rotates in a counterclockwise direction. Since the saddle supporter 116' rotates in a counterclockwise direction, it is possible to adjust the angle in such a way that the saddle 22 rotates in a counterclockwise direction, and the front end of the saddle 22 is tilted downward.

In this way, the function of a saddle angle adjustment according to a third exemplary embodiment of the present invention allows a user to ride a bicycle in the most comfortable posture based on the user' body type. When the bicycle runs up or down an inclined road, it is possible to easily adjust the angle of the saddle based on the inclination, whereupon the user's body does not tilt in one direction, thus preventing any accident. In particular, it is possible for a user to easily and freely adjust the angle of the saddle in such a way to drive the driving motor while the user is riding the bicycle.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. An apparatus for adjusting a bicycle saddle angle in a seated position while driving, comprising:
   a mount which includes a first hinge pin the bottom of which is slidable upward and downward through the upper portion of a saddle frame, and the top of which connects a portion between them to the center of the top in a shape of a first fork;

a supporter which includes a second hinge pin the bottom of which connects a portion between them to the center of the bottom in a shape of a second fork, and the top of which is connected with the first hinge pin and between the portions of the shaped of the first fork; and an actuator which is fixed with a bracket to be spaced apart from one side of the mount, wherein an extendable driving portion is connected to the second hinge pin at a corresponding position, wherein a saddle of the bicycle is fixed at the top of the supporter, so the angle of the saddle can be adjusted based on the rotation of the supporter with the aid of a driving of the actuator about the first hinge pin.

2. The apparatus of claim 1, wherein the actuator comprises:

a hydraulic cylinder which drives contractively the cylinder rod hinged with the second hinge pin;

a hydraulic circuit which is connected communicating with the hydraulic cylinder so as to change fluid;

a motor which is connected to the hydraulic circuit and is configured to provide a pumping driving force with respect to the flow of fluid of the hydraulic cylinder and the hydraulic circuit based on a normal and reverse direction rotation as electric power is supplied; and a switch which is configured to control of the supply of electric power with respect to a normal or reverse direction rotation and stop of the motor.

3. The apparatus of claim 2, wherein a front end portion of the cylinder rod further includes a connection member hinged with the second hinge pin to a longitudinal hole having a predetermined length in upward and downward directions.

4. The apparatus of claim 1, wherein the first hinge pin and the second hinge pin are disposed parallel with each other, and the bottom of the supporter including the second hinge pin is arranged rotatable about the first hinge pin.

5. An apparatus for adjusting a bicycle saddle angle in a seated position while driving, comprising:

a saddle supporter for supporting a saddle;

a worm wheel which is fixed at the bottom of the saddle supporter;

a worm shaft which allows to rotate the worm wheel;

a driving motor which is configured to rotate in a normal and reverse rotation direction of the worm shaft; and a housing which is configured to accommodate the worm wheel and the worm shaft and is fixed at a mount which is slidable upward and downward through the upper portion of a saddle frame.

6. The apparatus of claim 5, wherein the housing is configured to accommodate the driving motor.

7. The apparatus of claim 5, wherein the driving motor is controlled to rotate in the normal and reverse rotation direction based on the operation of an operation switch installed at a handle bar.

8. An apparatus for adjusting a bicycle saddle angle in a seated position while driving, comprising:

a saddle supporter for supporting a saddle;

a bracket to which the saddle supporter is engaged rotatable, wherein the bracket is supported by a mount which is slidable upward and downward over the top of a saddle frame;

a wire both ends of which are supported by the bracket, the wire being configured to connect the bracket and the saddle supporter in order for the saddle supporter to be rotatable with respect to the bracket; and an operation switch to which the wire is connected, thus pulling the wire or removing the pulling of the wire, thus allowing to adjust the angle of the saddle in such a way to rotate the saddle supporter with respect to the bracket.

9. The apparatus of claim 8, wherein both ends of the wire are supported spaced apart from the bracket with the saddle supporter being disposed between them, and the wire forms a closed loop.

10. The apparatus of claim 8, further comprising:

at least one guide roller which is disposed at both sides of the bracket with the saddle supporter being disposed between them, thus guiding the movement of the wire; and at least on direction changing roller which is disposed at both sides of the wire while corresponding to the guide roller, thus changing the moving direction of the wire.

11. The apparatus of claim 10, wherein one end of the wire is wound around the guide roller of one side and the direction changing roller of one side in a zigzag shape, and the other end of the wire is wound around the guide roller of the other side and the direction changing roller of the other side in a zigzag shape.

12. The apparatus of claim 10, wherein the guide roller and the direction changing roller are provided multiple in number, and the guide roller and the direction changing roller are arranged in the longitudinal direction of the saddle supporter.

* * * * *